July 12, 1932.  R. C. BATEMAN  1,866,790
METHOD OF MAKING TIRE MOLDS
Filed March 13, 1930
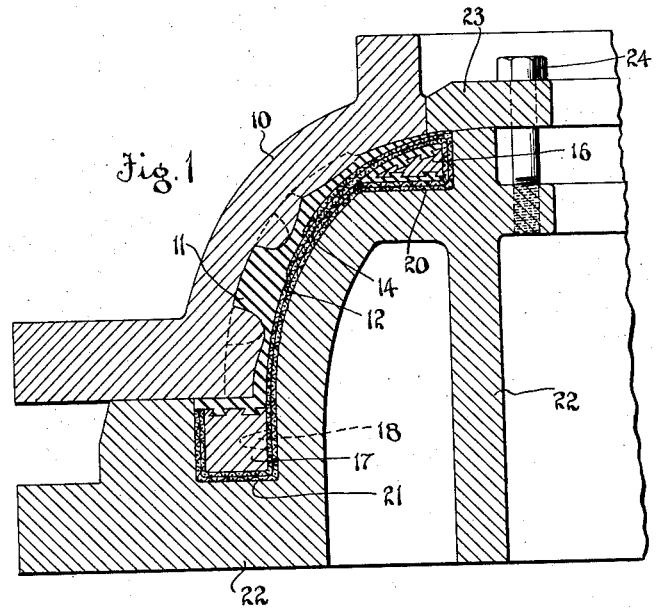
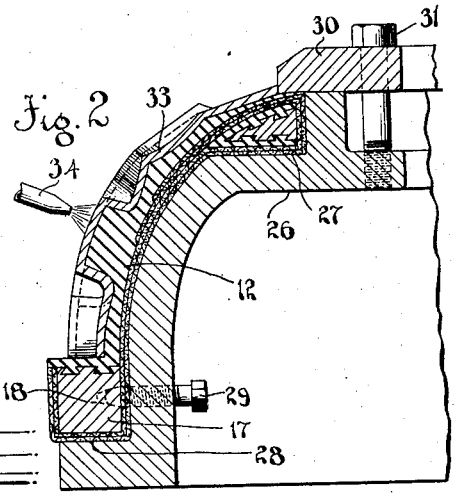
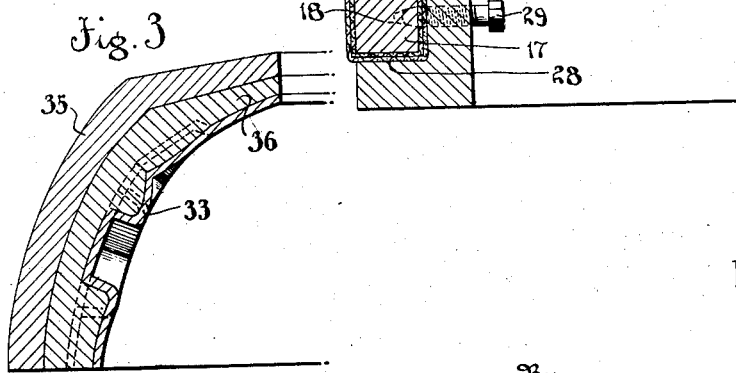
Inventor
Ralph C. Bateman
By
Attorney Patented July 12, 1932

1,866,790

UNITED STATES PATENT OFFICE

RALPH C. BATEMAN, OF AKRON, OHIO, ASSIGNOR TO THE GOODYEAR TIRE & RUBBER COMPANY, OF AKRON, OHIO, A CORPORATION OF OHIO

METHOD OF MAKING TIRE MOLDS

Application filed March 13, 1930. Serial No. 435,478.

This invention relates to a method of making molds and it has particular relation to a novel method that is especially applicable to the production of pneumatic or solid tire molds.

An object of the invention is to provide a method of making molds in which the tread design and lettering are produced without the necessity of machine work.

Another object of the invention is to provide a method of making molds in which a core is employed that will compensate for the shrinkage in rubber during vulcanization.

One method of making tire molds is by molding or forging a single piece of suitable metal into the form of a mold section and machining the tread design into the mold. The machining of the molds involves tedious and laborious engraving operations particularly in perfecting a tread design in the mold, and accordingly constitutes a major portion of the complete mold cost.

According to this invention a rubber tread compound is disposed in a mold section, the rubber being forced into the mold by means of a core section and cured while the core section is in position. The matrix so formed is then removed from the mold and a second core of larger dimensions is disposed within the matrix to thus compensate for the shrinkage which occurs during vulcanization of the rubber. Means is provided for depositing metal upon the rubber matrix and after a sufficient thickness of metal has been deposited, the metal shell is stripped therefrom. The matrix thus formed is then secured in molds in any convenient manner.

For a better understanding of the invention, reference may now be had to the accompanying drawing forming a part of this specification, in which:

Fig. 1 is a fragmentary cross-sectional view illustrating the manner of forming a flexible matrix for use in forming molds according to this invention;

Fig. 2 is a fragmentary cross-sectional view illustrating one form of preparing a portion of the mold which is in contact with the tire; and Fig. 3 is a fragmentary cross-sectional view disclosing a backing applied to the portion of the mold which is in contact with the tire.

In practicing the invention, a tire mold 10 of ordinary construction is provided having indentations 11 formed therein corresponding to the tread configuration of a finished tire. A matrix 12 formed of a rubber compound is reinforced about its inner circumference with rubberized fabric plies 14, the ends of which are wrapped about a bead ring 16, somewhat similar to a bead ring of a tire, and a limiting ring 17 having tapered holes 18 therein. The rings 16 and 17, the axes of which are coincidental, and vertical with reference to the drawing, are provided to engage recesses 20 and 21 of a core 22 to which a plate 23 is secured by means of bolts 24 and which is adapted to maintain the bead ring 16 in position.

The mold section 10 is disposed about the rubber compound of the matrix 12, which is forced into the tread indentations of the mold section by means of the core 22. The matrix 12 thus formed is subjected to vulcanization while the core section 22 is in position, after which the matrix is removed from the core and a second core 26 of slightly larger dimensions than that of the core section 22 is disposed within the confines of the vulcanized matrix. This is accomplished by positioning the bead ring 16 against a surface 27 and thence securing it in position by means of a plate 30 after which the ring 17 is drawn against a surface 28 by means of bolts 29 that are wedged within the tapered holes 18. A metal shell 33 is then deposited upon the matrix by electroplating or any convenient means, such as a spraying device 34. If the metal is deposited by electro-plating, it will be understood that the matrix is first coated with a thin layer of graphite or similar electro-conductive material upon which the metal layer can be plated. Inasmuch as this process is well known in the electro-plating art, it will not be dealt with further. The core 26 is made larger than the core 22 in order to stretch the matrix and thus compensate for shrinkage which occurs from vulcanization of rubber. After the sufficient thickness of metal has been deposited upon a matrix, the metal shell is stripped therefrom and, in order to increase the rigidity of the shell, it is provided with a backing 36 of metallic alloy having a relatively low fusion point. A matrix thus formed is then secured in molds in any convenient manner.

Although I have illustrated but the preferred forms of this invention and have described those forms in detail, it will be apparent to those skilled in the art that the invention is not so limited but that various minor modifications may be made therein without departing from the spirit of the invention or from the scope of the appended claims.

What I claim is:

1. A method of making molds which comprises forming a matrix about a core, vulcanizing the matrix, disposing the matrix about a core of a size sufficient to compensate for shrinkage of the matrix, and forming a metal shell upon the matrix.

2. A method of making molds which comprises forming a matrix about a core, vulcanizing the matrix, disposing the matrix about a core of a size sufficient to compensate for shrinkage of the matrix, forming a metal shell upon the matrix, removing the shell from the matrix, and applying a backing of metal thereto.

In witness whereof, I have hereunto signed my name.

Signed at Akron, in the county of Summit and State of Ohio, U. S. A., this 7th day of March, 1930.

RALPH C. BATEMAN.